(12) United States Patent
Beye et al.

(10) Patent No.: US 9,474,328 B2
(45) Date of Patent: *Oct. 25, 2016

(54) SPACER TEXTILE MATERIAL WITH TENSILE STRANDS IN NON-LINEAR ARRANGEMENTS

(71) Applicant: Nike, Inc., Beaverton, OR (US)

(72) Inventors: Douglas A. Beye, Beaverton, OR (US); Lysandre Follet, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 613 days.

This patent is subject to a terminal disclaimer.

(21) Appl. No.: 13/741,433

(22) Filed: Jan. 15, 2013

(65) Prior Publication Data

US 2014/0196310 A1 Jul. 17, 2014

(51) Int. Cl.
| | | |
|---|---|---|
| *B32B 5/22* | (2006.01) | |
| *D04B 21/20* | (2006.01) | |
| *D04B 1/22* | (2006.01) | |
| *A43B 23/02* | (2006.01) | |
| *A43C 1/00* | (2006.01) | |
| *A43C 1/04* | (2006.01) | |

(52) U.S. Cl.
CPC ......... *A43B 23/0205* (2013.01); *A43B 23/024* (2013.01); *A43C 1/00* (2013.01); *A43C 1/04* (2013.01); *B32B 5/22* (2013.01); *D04B 1/22* (2013.01); *D04B 21/20* (2013.01); *D10B 2403/021* (2013.01); *D10B 2403/0241* (2013.01); *D10B 2501/043* (2013.01); *Y10T 428/24628* (2015.01)

(58) Field of Classification Search
CPC .... A43B 23/024; A43B 23/026; B32B 5/06; B32B 5/10; B32B 5/22
USPC .......... 36/45, 50.1; 428/102, 103, 105, 107, 428/109–111, 114, 122, 123, 190; 442/239, 442/240, 242–244, 246, 255, 305, 306, 312, 442/313, 314

See application file for complete search history.

(56) References Cited

U.S. PATENT DOCUMENTS

| | | |
|---|---|---|
| 4,333,978 A | 6/1982 | Kocher |
| 4,705,586 A | 11/1987 | Pouget et al. |
| 4,785,558 A | 11/1988 | Shiomura |
| 4,863,776 A | 9/1989 | Sternlieb |

(Continued)

FOREIGN PATENT DOCUMENTS

| | | |
|---|---|---|
| EP | 0 212 984 A2 | 3/1987 |
| EP | 0 874 076 A2 | 10/1998 |

(Continued)

OTHER PUBLICATIONS

Office Action mailed Feb. 2, 2015 in U.S. Appl. No. 13/741,428.

(Continued)

*Primary Examiner* — Jenna Johnson
(74) *Attorney, Agent, or Firm* — Plumsea Law Group, LLC

(57) ABSTRACT

A spacer textile material has at least a portion of a tensile strand located between a first layer and a second layer of the spacer textile material where the first layer and second layer have been joined together to form channels in which the tensile strand moves freely. The tensile strand travels through the spacer textile material in a non-linear direction. Further, the channels may be formed in the spacer textile material in non-linear directions. The spacer textile material with a tensile strand may be incorporated into an article of footwear.

29 Claims, 10 Drawing Sheets

(56) References Cited

U.S. PATENT DOCUMENTS

| | | |
|---|---|---|
| 5,149,583 A | 9/1992 | Saarikettu |
| 5,475,904 A | 12/1995 | Le Roy |
| 5,601,907 A | 2/1997 | Matsumoto |
| 5,713,399 A | 2/1998 | Collette et al. |
| 6,052,921 A | 4/2000 | Oreck |
| 6,119,371 A | 9/2000 | Goodwin et al. |
| 6,533,885 B2 | 3/2003 | Davis et al. |
| 6,544,910 B2 | 4/2003 | Himmelsbach et al. |
| 6,835,257 B2 | 12/2004 | Perrine |
| 6,854,296 B1 | 2/2005 | Miller, III |
| 6,910,288 B2 | 6/2005 | Dua |
| 6,957,504 B2 | 10/2005 | Morris |
| 7,076,891 B2 | 7/2006 | Goodwin |
| 7,316,840 B2 | 1/2008 | Neculescu et al. |
| 7,479,195 B2 | 1/2009 | Leidig et al. |
| 7,568,298 B2* | 8/2009 | Kerns ............. A43B 1/04 2/96 |
| 7,718,249 B2 | 5/2010 | Russell et al. |
| 7,776,171 B2 | 8/2010 | Lehto et al. |
| 7,824,513 B2 | 11/2010 | Chernyak et al. |
| 7,883,594 B2 | 2/2011 | Albanese et al. |
| 8,056,287 B2 | 11/2011 | DeMello |
| 8,132,340 B2 | 3/2012 | Meschter |
| 8,266,827 B2 | 9/2012 | Dojan et al. |
| 8,312,645 B2 | 11/2012 | Dojan et al. |
| 8,312,646 B2 | 11/2012 | Meschter et al. |
| 8,800,172 B2 | 8/2014 | Dua et al. |
| 8,881,430 B2 | 11/2014 | Seamarks et al. |
| 8,887,410 B2 | 11/2014 | Dojan et al. |
| 8,893,405 B2 | 11/2014 | Dojan et al. |
| 2003/0046843 A1 | 3/2003 | Chien |
| 2004/0181972 A1 | 9/2004 | Csorba |
| 2008/0110048 A1 | 5/2008 | Dua et al. |
| 2008/0110049 A1 | 5/2008 | Sokolowski et al. |
| 2010/0154256 A1* | 6/2010 | Dua ............. A43B 1/04 36/25 R |
| 2010/0186874 A1 | 7/2010 | Sussmann |
| 2010/0192410 A1 | 8/2010 | Marvin et al. |
| 2010/0323148 A1 | 12/2010 | Lafond et al. |
| 2011/0192058 A1 | 8/2011 | Beers et al. |
| 2011/0192059 A1 | 8/2011 | Spanks et al. |
| 2012/0023778 A1 | 2/2012 | Dojan et al. |
| 2012/0198727 A1 | 8/2012 | Long |
| 2012/0233882 A1* | 9/2012 | Huffa ............. A43B 1/04 36/45 |
| 2013/0019500 A1 | 1/2013 | Greene |
| 2013/0145652 A1 | 6/2013 | Podhajny et al. |
| 2014/0068968 A1 | 3/2014 | Podhajny et al. |
| 2014/0196310 A1 | 7/2014 | Beye et al. |
| 2014/0196311 A1 | 7/2014 | Follet et al. |

FOREIGN PATENT DOCUMENTS

| | | |
|---|---|---|
| EP | 1 055 757 A1 | 11/2000 |
| EP | 1 184 499 A1 | 3/2002 |
| EP | 1 367 913 B1 | 2/2008 |
| WO | 9003744 | 4/1990 |
| WO | 2012/015588 A1 | 2/2012 |

OTHER PUBLICATIONS

International Preliminary Report on Patentability and Written Opinion of the International Searching Authority issued Jul. 21, 2015 in International Patent Application No. PCT/US2014/011386.
International Preliminary Report on Patentability and Written Opinion of the International Searching Authority issued Jul. 21, 2015 in International Patent Application No. PCT/US2014/011387.
International Preliminary Report on Patentability and Written Opinion of the International Searching Authority issued Jul. 21, 2015 in International Patent Application No. PCT/US2014/011389.
International Preliminary Report on Patentability and Written Opinion of the International Searching Authority issued Jul. 21, 2015 in International Patent Application No. PCT/US2014/011392.
International Search Report and Written Opinion mailed Jul. 4, 2014 in PCT/US2014/011386.
International Search Report and Written Opinion mailed Jun. 30, 2014 in PCT/US2014/011387.
International Search Report and Written Opinion mailed Jul. 15, 2014 in PCT/US2014/011389.
International Search Report and Written Opinion mailed Nov. 6, 2014 in PCT/US2014/011392.

* cited by examiner

US 9,474,328 B2

SPACER TEXTILE MATERIAL WITH TENSILE STRANDS IN NON-LINEAR ARRANGEMENTS

RELATED APPLICATIONS

This application is related to the following commonly owned copending applications: Follett, U.S. Patent Application Publication Number 2014/0196316 published on Jul. 17, 2014, entitled "Article of Footwear Incorporating Braided Tensile Strands"; Beye et al., U.S. Patent Application Publication Number 2014/0196314 published on Jul. 17, 2014, entitled "Spacer Textile Material with Tensile Strands Having Multiple Entry And Exit Points"; Beye et al., U.S. Patent Application Publication Number 2014/0196315 published on Jul. 17, 2014, entitled "Spacer Textile Material with Strands that Intersect"; and Follett et al., U.S. Patent Application Publication Number 2014/0196311 published on Jul. 17, 2014, entitled "Spacer Textile Material with Channels Having Multiple Strands", which are all incorporated by reference herein in their entireties.

BACKGROUND

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. In addition, the upper may include a tongue that extends under the lacing system to enhance adjustability and comfort of the footwear, and the upper may incorporate a heel counter.

The various material elements forming the upper impart specific properties to different areas of the upper. For example, textile elements may provide breathability and may absorb moisture from the foot, foam layers may compress to impart comfort, and leather may impart durability and wear-resistance. As the number of material elements increases, the overall mass of the footwear may increase proportionally. The time and expense associated with transporting, stocking, cutting, and joining the material elements may also increase. Additionally, waste material from cutting and stitching processes may accumulate to a greater degree as the number of material elements incorporated into an upper increase. Moreover, products with a greater number of material elements may be more difficult to recycle than products formed from fewer material elements. By decreasing the number of material elements, therefore, the mass of the footwear and waste may be decreased, while increasing manufacturing efficiency and recyclability.

The sole structure is secured to a lower portion of the upper so as to be positioned between the foot and the ground. In athletic footwear, for example, the sole structure includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal a lower surface of the foot to enhance footwear comfort.

SUMMARY

In one aspect, a spacer textile material includes a first layer, a second layer and a plurality of connecting members extending between and joining the first layer and the second layer. The spacer textile material also includes a tensile strand, where a first portion of the tensile strand and a second portion of the tensile strand are disposed between the first layer and second layer. The spacer textile material also includes a first channel and a second channel bounded by portions of the first layer and the second layer that are in direct contact. The first portion of the tensile strand is disposed within the first channel and the second portion of the tensile strand is disposed within the second channel. The first channel and the second channel are arranged in a non-linear pattern.

In another aspect, a spacer textile material includes a first layer, a second layer and a plurality of connecting members extending between and joining the first layer and the second layer. The spacer textile material also includes a tensile strand. The first layer is joined to the second layer to define a plurality of channels arranged in a non-linear pattern and the tensile strand extends through the plurality of channels.

In another aspect, an article of footwear includes an upper and a sole structure, where at least a portion of the upper comprises: a first layer, a second layer, a plurality of connecting members extending between and joining the first layer and the second layer and a tensile strand. The first layer is joined to the second layer along a plurality of welds and where the plurality of welds define a plurality of channels arranged in a non-linear pattern. The tensile strand is disposed within the plurality of channels.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
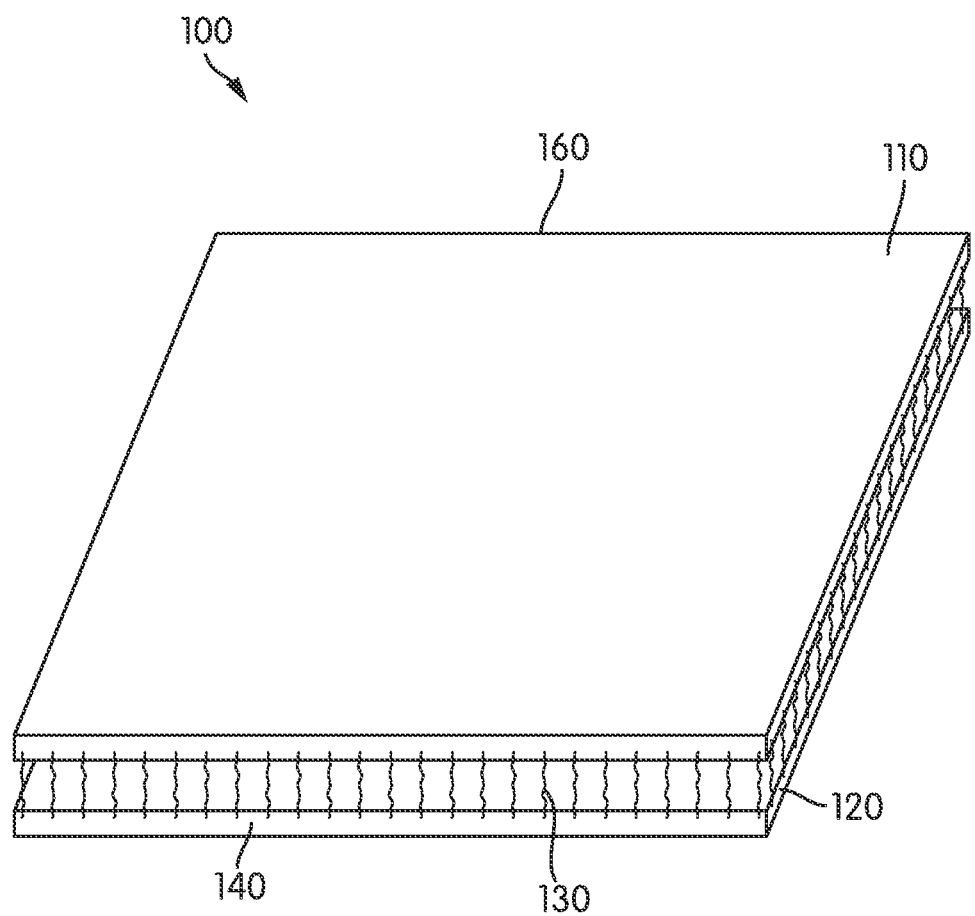
FIG. 1 shows an embodiment of the spacer textile material.

FIG. 1 illustrates an embodiment of a spacer textile material 100. In one embodiment, spacer textile material 100 may include a first layer 110, as well as a second layer 120 that is at least partially coextensive with first layer 110. In addition, spacer textile material 100 may have a plurality of connecting members 130 that extend between and join first layer 110 and second layer 120.

Connecting members 130 may be arranged to form a series of rows. The rows of connecting members 130 are separated by various spaces. In some embodiments, the rows formed by connecting members 130 may be substantially parallel to each other and distributed at substantially equal distances across spacer textile material 100. In other embodiments, the rows could be non-parallel and/or unevenly spaced apart. Spaces may be areas within spacer textile material 100 where connecting members 130 are absent. Typically, spaces may include areas between the rows formed by connecting members 130.

Spacer textile material 100 also may define at least a pair of opposite edges, first edge 140 and second edge 160, which are also edges of first layer 110 and second layer 120. In some embodiments, each of first edge 140 and second edge 160 may be substantially parallel to the rows formed by connecting members 130.

The spacer textile material may be formed by any suitable method for manufacturing such a material. A general process may include one or more yarns being fed into a conventional knitting apparatus. The knitting apparatus may mechanically manipulate yarns to form each of a first layer and a second layer. The knitting apparatus may also manipulate yarns to form connecting members between the first and second layers. As such, the first layer and second layer may be knitted layers, and the connecting members may be sections of at least one yarn that extend between the first layer and second layer. Moreover, the process forms spaces, edges, and stabilization structures.

Once formed, the spacer textile material exits the knitting apparatus and is collected on a roll. After a sufficient length of spacer textile material is collected, the roll may be shipped or otherwise transported to a manufacturer to utilize the spacer textile material for the manufacture of footwear or for any other purposes. Although not always performed, the spacer textile material may be subjected to various finishing operations (e.g., dying, fleecing) prior to being collected on a roll.

Examples of spacer textile material and methods of making spacer textile material are disclosed in any of the following: Chao et al., U.S. Patent Publication Number 2013/0266773, entitled, "Spacer Textile Materials and Methods for Manufacturing the Spacer Textile Materials," published on Oct. 10, 2013; Goodwin et al., U.S. Pat. No. 6,119,371, entitled "Resilient Bladder for Use in Footwear," issued on Sep. 19, 2000; and Goodwin, U.S. Pat. No. 7,076,891, entitled "Flexible Fluid-Filled Bladder for an Article of Footwear," issued on Jul. 18, 2006, the entirety of each being incorporated by reference.

Some embodiments of a spacer textile material may include a tensile strand. In some embodiments, one or more portions of the tensile strand may be located between the first layer and the second layer. In some embodiments, one or more portions of the tensile strand may be disposed in channels that may be created by joining a first layer and second layer of the spacer textile material. After assembly, the tensile strand may move freely within the one or more channels.

Figure 2:
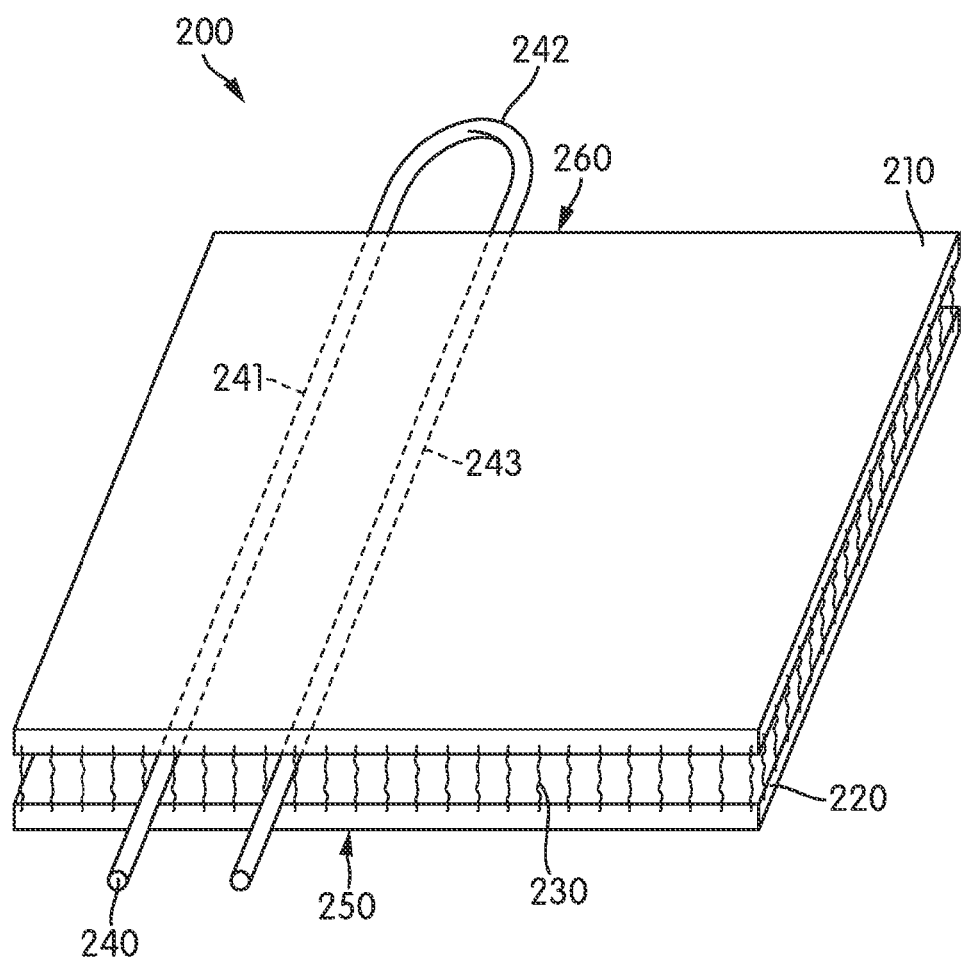
FIG. 2 shows an embodiment of the spacer textile material having a tensile strand disposed between a first layer and a second layer.

As discussed above, the spacer textile material may include at least one tensile strand. The tensile strand may be located in any portion of the spacer textile material. FIG. 2 shows an embodiment of a spacer textile material 200. Spacer textile material 200 may include tensile strand 240. Further, spacer textile material 200 may include a plurality of connecting members 230 that extend between and join first layer 210 and second layer 220. Connecting members 230 may be arranged to form a series of rows that are separated by various spaces. A portion of tensile strand 240 may be disposed between first layer 210 and second layer 220. In particular, tensile strand 240 may be disposed in the space created between connecting members 230.

Spacer textile material 200 also defines at least a pair of opposite edges, first edge 250 and second edge 260. First edge 250 and second edge 260 also may be edges of first layer 210 and second layer 220. In some embodiments, each of first edge 250 and second edge 260 may be substantially parallel to the rows formed by connecting members 230. However, in other embodiment, first edge 250 and/or second edge 260 may not be parallel with the rows formed by connecting members 230.

In different embodiments, the arrangement of a tensile strand within a spacer textile material can vary. For example, various portions of a tensile strand may extend through spacer textile material (i.e., between a first layer and a second layer) in parallel with, or at various angles to, one or more edges of the spacer textile material. Additionally, in some embodiments, different portions or segments of a tensile strand may be aligned in parallel with one another. In other embodiments, different portions or segments of a tensile strand could be disposed at various angles to one another.

An exemplary arrangement of a tensile strand within a spacer textile material is shown in FIG. 2. In the embodiment shown in FIG. 2, a first portion 241 of tensile strand 240 may be disposed between first layer 210 and second layer 220 of spacer textile material 200. Moreover, first portion 241 may generally extend from first edge 250 to second edge 260. In addition, a third portion 243 of tensile strand 240 may also be disposed between first layer 210 and second layer 220 of spacer textile material 200 and may likewise extend between first edge 250 and second edge 260. Furthermore, a second portion 242 of tensile strand 240 may be disposed between first portion 241 and third portion 243. In contrast to first portion 241 and third portion 243, which may be disposed between adjacent layers of spacer textile material 200, second portion 242 may extend outwardly from second edge 260 such that second portion 242 is not disposed between first layer 210 and second layer 220. In some embodiments, second portion 242 forms a loop that extends from second edge 260 of spacer textile material 200.

As one exemplary arrangement, first portion 241 and third portion 243 are shown extending in parallel between first edge 250 and second edge 260. Moreover, first portion 241 and third portion 243 may be oriented in a direction that is approximately perpendicular to first edge 250 and second edge 260. However, as previously discussed, in other embodiments one or more portions could vary in their orientations relative to other portions of a tensile strand and/or could vary in their orientations relative to edges of a spacer textile material.

The tensile strands of the disclosure may be formed from any generally one-dimensional material. As utilized with respect to the present disclosure, the term "one-dimensional material" or variants thereof is intended to encompass generally elongate materials exhibiting a length that is substantially greater than a width and a thickness.

The tensile strands of the disclosure may be formed from any suitable material. Accordingly, suitable materials for a tensile strand, for example tensile strand 240 of FIG. 2, may include various filaments, fibers, yarns, threads, cables, cords, or ropes. Suitable material for a tensile strand may be formed from or include rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, steel, and various combination of these kinds of materials.

Filaments have an indefinite length and in some cases a single filament can be utilized as a tensile strand, such as tensile strand 240. Fibers have a relatively short length and generally go through spinning or twisting processes to produce a strand of suitable length. An individual filament utilized in a tensile strand may be formed from a single material (i.e., a monocomponent filament) or from multiple materials (i.e., a bicomponent filament). Similarly, different filaments may be formed from different materials. As an example, yarns utilized as tensile strand 240 may include filaments that may be formed from a common material, or may include filaments that may be formed from two or more different materials. Similar concepts also apply to threads, cables, or ropes.

The spacer textile material of the disclosure may include two or more tensile strands. In some embodiments, when the spacer textile material includes multiple tensile strands, the tensile strands may be made from the same material. In some embodiments, the tensile strands may be made from different materials. When the tensile strands are made from different materials, the tensile strands may include different characteristics. For example, a first tensile strand may stretch when a force is applied. In some embodiments, a second tensile strand may stretch less than first tensile strand. In other embodiments, a second tensile strand may stretch more than the first tensile strand.

In some embodiments, the thickness of tensile strands may also vary significantly to range from less than 0.03 millimeters to more than 5 millimeters, for example. Although one-dimensional materials will often have a cross-section where the width and the thickness are substantially equal (e.g., a round or square cross-section), some one-dimensional materials may have a width that is greater than a thickness (e.g., a rectangular, oval, or otherwise elongate cross-section). Despite the greater width, a material may be considered one-dimensional if the length of the material is substantially greater than the width and the thickness of the material.

In some embodiments having multiple tensile strands, the thickness of each strand may be the same. In other embodiments, the thickness of each tensile strand may be different. The relative thickness of two or more tensile strands may be selected according to various factors including desired strength, elasticity, manufacturing considerations as well as possible other factors.

Examples of suitable tensile strands are disclosed in any of the following: Dojan et al., U.S. Pat. No. 8,925,129, entitled, "Methods of Manufacturing Articles of Footwear With Tensile Strand Elements," issued on Jan. 6, 2015; Dojan et al., U.S. Pat. No. 8,819,963, entitled, "Articles of Footwear With Tensile Strand Elements," issued on Sep. 2, 2014; and Dojan et al., U.S. Pat. No. 8,973,288, entitled "Footwear Incorporating Angled Tensile Strand Elements," issued on Mar. 10, 2015, the entirety of each being hereby incorporated by reference.

A tensile strand can be configured in any pattern, configuration or arrangement in a spacer textile material. In some embodiments, a tensile strand can be confined to a particular region of a spacer textile material. In other embodiments, a tensile strand may be associated with multiple different regions of a spacer textile material, including the entirety of the spacer textile material. Moreover, a tensile strand can extend through a spacer textile material (i.e., between adjacent layers), as well as outside of the layers that form the spacer textile material. In some embodiments, portions of a tensile strand may extend along an outer surface or outer face of a layer. In still other embodiments, portions of a tensile strand could extend along an edge of a spacer textile material.

For purposes of this disclosure, the term "opening" may include a space along an edge of the spacer textile material between a first layer and a second layer that is also between connecting members of the spacer textile material. Further, the term "opening" may include a space between the knitted strands of the first layer or second layer of the spacer textile. Further, the term "opening" may include a space, slit or hole in the first layer or second layer created during the preparation of the spacer textile material. As stated above, the tensile strand may be disposed through any opening on the spacer textile material.

The figures of this disclosure may show the ends of each tensile strand extending beyond the edges or faces of one or more layers of the spacer textile material. However, the ends of each tensile strand may be finished in any suitable manner. For example, in some embodiments, the tensile strand ends may extend beyond the edge of the spacer material. In such an embodiment, the ends of the tensile strand may extend into a second material or structure. Further, the ends of the tensile strand may be knotted or tied off so that the ends may not recess into the spacer textile material. Further, the ends may extend into the spacer textile material in a second direction and continue to extend throughout the material in a selected manner or pattern. In other embodiments, the ends of the tensile strand may be flush with the edge of the spacer textile material. Still further, the end of the tensile strand may be joined to the edge of one or more layers of the spacer textile material.

In addition to a tensile strand, the spacer textile material may include provisions for restricting the movement of the tensile strand within the spacer textile material. In some embodiments, a spacer textile material can include provisions for restricting the movement of one portion of the tensile strand. In other embodiments, a spacer textile material can include provisions for restricting two or more portions of a tensile strand (for example, two adjacent sides or ends of a tensile strand). In some embodiments, a spacer textile material can include one or more channels that act to restrict or restrain the movement various portions of the tensile strand. For example, a tensile strand disposed inside a channel of a spacer textile material may move freely in a longitudinal direction of the channel, while motion of the tensile strand in the lateral direction of the channel may be restricted.

Figure 5:
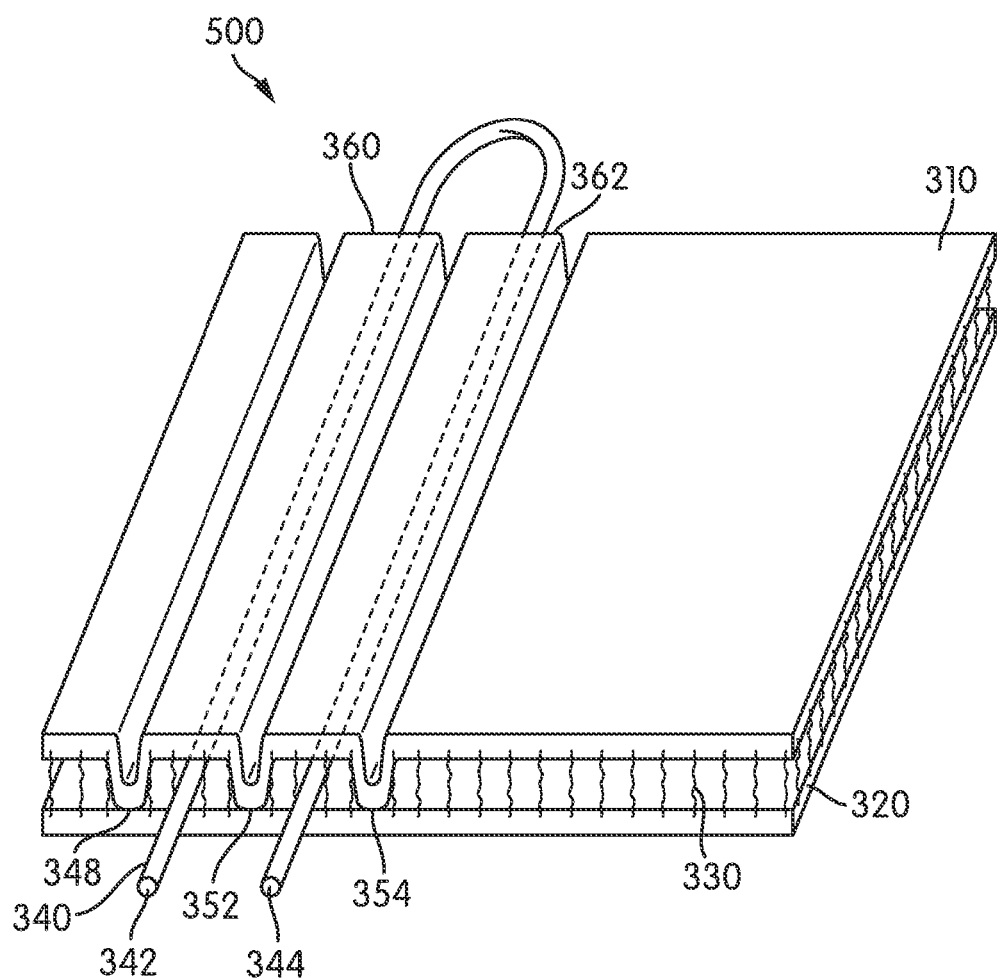
FIG. 5 is a schematic diagram of an embodiment of the spacer textile material having a tensile strand disposed in channels defined by one or more welds created by a welding method.

For instance, FIG. 5, which is discussed below is further detail, depicts spacer textile material 500 having portions of a tensile strand disposed within spacer textile material 500. Portions of a tensile strand may be further disposed in two channels, first channel 360 and second channel 362. As shown in FIG. 5, the tensile strand portions may be restricted in the lateral direction on both sides while the tensile strand portions are free to move within each channel in the longitudinal direction.

The channels formed in the spacer textile material may have any width. In some embodiments the width of the channel may accommodate one tensile strand. In other embodiments, the width of the channel may be large enough to accommodate two or more tensile strands. In addition, a first channel may have one width and a second channel may have a second width. The widths of multiple channels may be the same or the widths may be different. Further, the width of a single channel may change over the run of the channel. In other words, the width of the channel may vary throughout the length of the channel. For example, a channel may have a width that increases from a first edge to a second edge of a spacer textile material.

In some embodiments, channels of a spacer textile material may be bounded by portions of the first layer and the second layer that are in direct contact. In some embodiments, sections of the first layer and the second layer may be joined or fused to form one or more channels. The first layer may be joined to the second layer by any suitable method of joining such layers. In some embodiments, the first layer is joined to the second layer through a welding method. However, in other embodiments, the joining of the first layer and the second layer could be accomplished using other methods including, but not limited to: stitching, adhesives as well as other joining methods.

In some embodiments, the first layer and the second layer could be joined in a manner that forms one or more channels for guiding and controlling the configuration and possible motions of a tensile strand. For example, in some embodiments one or more welds could be used to join the first layer and the second layer such that adjacent welds form the walls of one or more channels.

In some embodiments, welding methods may be utilized to join the first layer to the second layer. The welding method utilized to join the first layer to the second layer may include a high frequency welding method. In some embodiments, the high frequency welding method may include an ultrasonic welding method or a radio frequency welding method.

In those embodiments that include ultrasonic welding methods, an ultrasonic welding device is used to join the first layer to the second layer of the spacer textile material. Ultrasonic welding devices utilize high frequency ultrasonic acoustic vibrations. The vibrations may be applied locally to a portion of the spacer textile material. Further, the vibrations applied to the spacer textile material cause friction. The friction softens the spacer textile material to fuse the first layer to the second layer. The fusion of the first layer to the second layer may be considered a solid state weld.

Examples of ultrasonic techniques and equipment are disclosed in any of the following: Albanese et al., U.S. Pat. No. 7,883,594, entitled "Wrapped pile weatherstripping and methods of making same," issued on Feb. 8, 2011; Chernyak, U.S. Pat. No. 7,824,513, entitled "Apparatus and method for making pile articles and improved pile articles made therewith," issued on Nov. 2, 2010; Lehto et al., U.S. Pat. No. 7,776,171, entitled "Arrangement and method for treatment of a material by means of an ultrasonic device," issued on Aug. 17, 2010; Perrine, U.S. Pat. No. 6,835,257, entitled "Ultrasonic weld pattern for adsorbent containing package" issued on Dec. 28, 2004; and Collette et al., U.S. Pat. No. 5,713,399, entitled "Ultrasonic seaming of abutting strips for paper machine clothing" issued on Feb. 3, 1998; the entirety of each being hereby incorporated by reference. One or more of the principles, concepts or methods disclosed in the cited references above may be implemented for preparing the welds on the spacer textile material of this disclosure.

Figure 3:
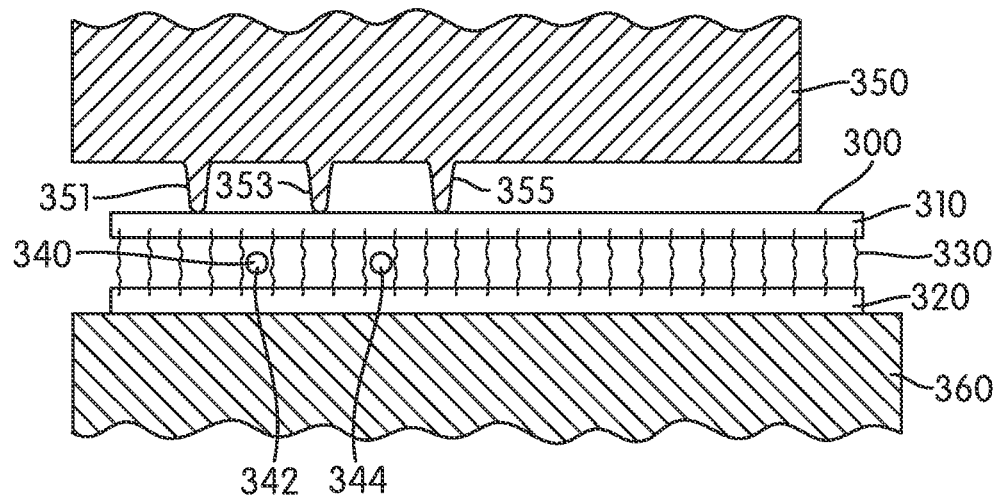
FIG. 3 is a schematic diagram of an embodiment of the spacer textile material having a tensile strand in a welding device prior to the joining of the first layer and second layer.

FIG. 3 shows an embodiment of spacer textile material 300 in a welding device. Spacer textile material 300 may include first layer 310, second layer 320 and connecting members 330. Spacer textile material 300 may further include a tensile strand 340 with first end 342 and second end 344. Tensile strand 340 may be located between first layer 310 and second layer 320.

In order to fuse portions of first layer 310 and second layer 320 together, spacer textile material 300 having tensile strand 340 may be positioned between a horn 350 and an anvil 360 of the welding device. As seen in FIG. 3, horn 350 may have a one or more protrusions. In some embodiments, horn 350 may have first protrusion 351, second protrusion 353, and third protrusion 355.

Each protrusion may form a pattern that is to be welded into the spacer textile material. The protrusions may form any suitable pattern. The patterns formed by one or more protrusions may include a stripe or line, parallel stripes or lines, perpendicular stripes or lines, a zig-zag pattern, a triangular pattern, and a wavy pattern, among other patterns.

For purposes of illustration, horn 350 and anvil 360 are shown schematically in the embodiments. Generally, the anvil 360 is a fixed component where the material to be welded rests or is nested. The horn 350 may be a sonotrode, which is connected to a transducer (not shown). The transducer causes the horn 350 to resonate or emit an acoustic vibration. In some embodiments, the frequency at which a horn vibrates may be between about 15 kHz and 85 kHz. Some examples of typical frequencies at which a horn vibrates include 15 kHz, 20 kHz, 30 kHz, 35 kHz, 40 kHz, and 70 kHz. The frequency chosen may depend on the material being welded as well as possibly other factors.

Horn 350 and anvil 360 come together under pressure to join a first material to a second material. In the embodiments shown in FIGS. 3 and 4, a first layer 310 is joined to a second layer 320 of spacer textile material 300. First layer 310 may be joined to second layer 320 in the location in which the material comes in contact with one or more of the protrusions, including first protrusion 351, second protrusion 353, and third protrusion 355, of horn 350.

Figure 4:
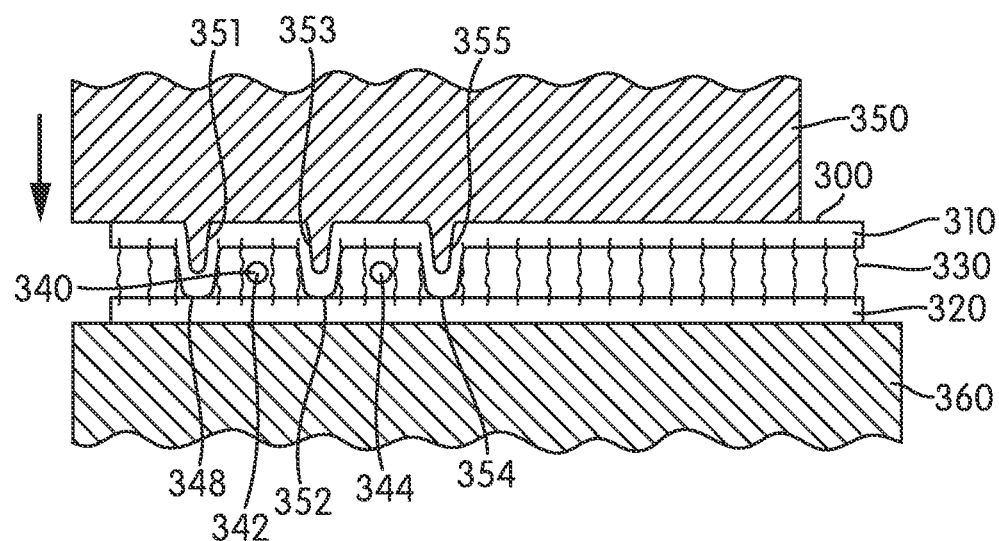
FIG. 4 is a schematic diagram of an embodiment of a welding device during the joining of the first layer and second layer of a spacer textile material having a tensile strand disposed between a first layer and a second layer.

FIG. 4 provides a schematic of an embodiment of an ultrasonic welding method. In FIG. 4, first protrusion 351, second protrusion 353 and third protrusion 355 of horn 350 cause first layer 310 to meet second layer 320 at first weld 348, second weld 352 and third weld 354. The transducer may be activated to cause horn 350 to resonate at a selected frequency. The vibrations of horn 350 generate friction between first layer 310 and second layer 320 of spacer textile material 300 and horn 350. The friction causes the materials of first layer 310 and second layer 320 to soften or melt. First layer 310 and second layer 320 may be allowed to cool to cause the layers to fuse to each other. Following this joining process, first layer 310 and second layer 320 may be fused or welded in those areas contacted by horn 350.

FIG. 5 depicts an embodiment of the welded spacer textile material 500. As can be seen, first weld 348, second weld 352 and third weld 354 may be generated by a welding device, as shown in FIG. 4. At each weld, first layer 310 may be fused to second layer 320. Further, first weld 348, second weld 352, and third weld 354 define two channels, first channel 360 and second channel 362. Both channels include portions of tensile strand 340. Tensile strand 340 is free to move in a longitudinal direction within the channels. However, the welds on both sides of tensile strand 340 restrain the lateral movement of tensile strand 340 within each channel of the spacer textile material 500.

In some embodiments, the welded spacer textile material, or a portion of the welded spacer textile material, may be incorporated into footwear, for example, as shown in FIG. 14, discussed below in further detail. In some cases, the spacer textile material may be configured for use in a wide range of athletic footwear styles, including running shoes, basketball shoes, cross-training shoes, football shoes, golf shoes, hiking shoes and boots, ski and snowboarding boots, soccer shoes, tennis shoes, and walking shoes, for example. Concepts associated with the spacer textile material may also be utilized with footwear styles that are generally considered to be primarily non-athletic, including dress shoes, loafers, sandals, casual shoes, clogs, flats, heels, pumps, wedges, and work boots.

In addition to footwear, the spacer textile material may be incorporated into other types of apparel and athletic equipment, including helmets, gloves, and protective padding for sports, such as football and hockey. Similar material may also be incorporated into cushions and other compressible structures utilized in household goods and industrial products.

Additionally, the discussion and figures disclose various configurations of a spacer textile material. Although portions of the spacer textile material are disclosed as being incorporated into footwear, the spacer textile material may be utilized with a variety of other products or for a variety of other purposes. In some embodiments, the spacer textile material may be utilized in apparel, such shirts, shorts, pants, outerwear, sports uniforms/jerseys, hats, socks, and undergarments, among other pieces of apparel.

The welding method described above is not restricted to the patterns described in this disclosure. The welding device may be configured to prepare a spacer textile material with a wide variety of patterns and textures.

The spacer textile material may be formed from any suitable material. In some embodiments, the material used in making a spacer textile material may be suitable for the joining method utilized to join the first layer to the second layer of the spacer textile material.

In those embodiments where an ultrasonic welding method is utilized to join the first layer and second layer of the spacer textile material, the spacer textile material may be made of any material suitable for such a spacer textile configuration. Further, the spacer textile material may be made of any material suitable for high frequency welding methods. Materials suitable for high frequency welding include thermoplastic material or natural material coated with a thermoplastic material. Examples of material suitable for high frequency welding methods include an acrylic, a nylon, a polyester, a polylactic acid, a polyethylene, a polypropylene, polyvinyl chloride (PVC), an urethane, a natural fiber, such as cotton or wool, that is coated with one or more thermoplastic materials, such as an ethyl vinyl acetate or thermoplastic polyurethane, and combinations thereof.

In some embodiments, the first layer and the second layer of a spacer textile material may be made of the same material or combination of materials. In other embodiments, the first layer may be made of one suitable material or combination of materials, and the second layer may be made of a second suitable material or combination of materials that are different from the first layer.

Further, the connecting members of the spacer textile material may be made of any suitable material. In some embodiments, the material of the connecting member may be the same as the material of the first layer. In other embodiments, the material of the connecting members may be the same as the material of the second layer. In still further embodiments, the material of the connecting members may be substantially different than both the material of the first layer and the material of the second layer.

Other welding methods may be utilized to join layers of a spacer textile material. For example, in some embodiments a radio frequency (RF) welding method could be used. In some embodiments, radio frequency welding could be used with a hot melt adhesive. In some cases, the use of a hot melt adhesive may enhance the application of RF welding to a low mass spacer textile material.

Welding methods could also be used with a variety of different materials. In some embodiments, materials having desired channel geometry can be achieved by selecting a combination of a welding method and a suitable material or materials. For example, some embodiments could use thermoplastic polyurethane (TPU) in combination with ultrasonic welding to achieve the desired channel geometry on a portion of an upper or other section of an article.

Still other methods are possible for joining layers of a spacer textile material. As one example, in other embodiments, the first layer may be joined to the second layer by a thermal fusion method. The thermal fusion method may include heat bonding. Heat bonding methods include hot die heating, steam heating or hot air heating.

In further embodiments, the first layer may be joined to the second layer through stitching methods or weaving methods. In some embodiments, where the layers are joined through stitching methods, the material used to form the stitch may be the same as the material of the first layer or second layer. In other embodiments, the materials used to form the stitch may be a different material from both the first layer and the second layer of the spacer textile material.

It will be understood that the embodiments are not limited to any particular method for forming channels in a spacer textile material. In particular, the embodiments depict various configurations of a spacer textile material that allows for tensile strands (such as wires) to be captured and guided through various channels. Although the following embodiments may reference welding or welds used to join regions of layers in a spacer textile material, it should be understood that in other embodiments the regions of joined material could be created using stitching, gluing, as well as possibly other methods.

One or more tensile strands and/or associated channels could be arranged in a variety of configurations within a spacer textile material. As stated above, portions of the tensile strand may enter or exit the spacer textile material at any point on the material. Further, the tensile strands, and channels in which the tensile strands are disposed, may be arranged in any pattern including, but not limited to: linear patterns, non-linear patterns, regular patterns, irregular patterns as well as any other patterns.

FIGS. 6 through 11 illustrate various different configurations or arrangements of one or more tensile members in a spacer textile material. It will be understood that the following configurations are only intended to be exemplary and still other configurations may be possible in other embodiments. Moreover, features of the different embodiments may be combined to create still further arrangements for one or more tensile strands within a spacer textile material.

Some embodiments may include tensile strands that extend through portions of a spacer textile material in various non-linear patterns or configurations. The term "non-linear pattern" as used throughout this detailed description and in the claims may refer to a pattern for tensile strands as well as the associated channels and/or welds used with the tensile strands. Moreover, a non-linear pattern is any pattern having at least one non-linear element. For example, a non-linear pattern for a tensile strand may be one in which two or more portions of the tensile strand are not parallel. As another example, a non-linear pattern for a tensile strand may be formed using two separate tensile strands that are arranged in a non-parallel manner with respect to one another. Likewise, a non-linear pattern for a channel and/or weld may be one in which two or more channels and/or welds are not parallel. Similarly, a non-linear pattern for a channel and/or weld may be one in which two or more portions of a single channel and/or a single weld are not parallel.

Non-linear patterns in tensile strands, channels and/or welds associated with a spacer textile material can be accomplished by forming these elements with one or more bends, turns, arcs, curves, loops as well as by the use of possibly other provisions. For example, some embodiments may include a plurality of channels that are angled with respect to an edge of a spacer textile material. Other embodiments can include tensile strands with bends, kinks and loops that cause two or more portions of the tensile strand to be non-parallel.

For purposes of clarity, the term "plurality of channels" as used throughout this detailed description and in the claims refers to any group of two or more channels. Likewise, the term "plurality of welds" as used throughout this detailed description and in the claims refers to any group of two or more welds.

Figure 6:
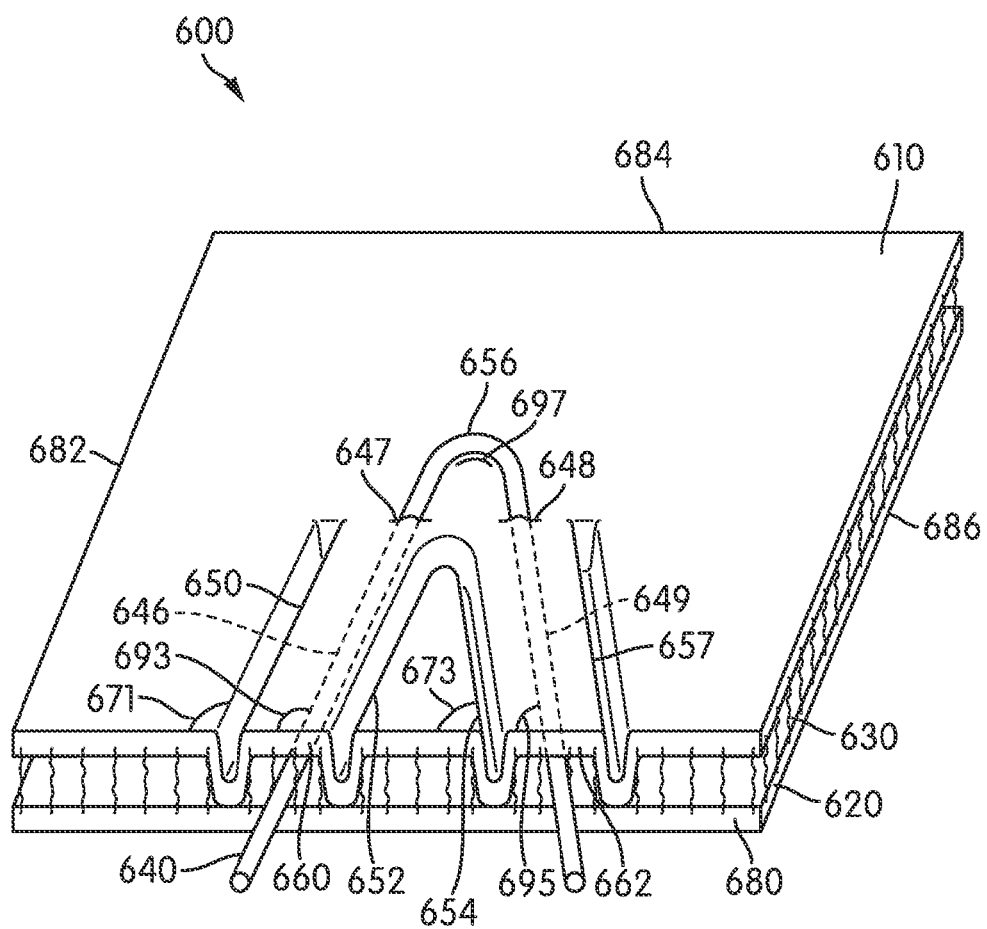
FIG. 6 is a schematic diagram of an embodiment of the spacer textile material having a tensile strand where the tensile strand is located through the spacer textile material in a non-linear pattern.

FIG. 6 is an embodiment in which multiple portions of the tensile strand extend from and through the spacer textile material in a generally non-linear pattern or configuration. A spacer textile material may include provisions for controlling the orientation of a tensile strand, which may allow the direction of the tension to be better controlled through a portion of a material, such as a shoe upper. In addition, the tensile strand may be disposed above the face of a layer of the spacer textile material. In some embodiments, when the tensile strand may be disposed above the face of a layer of a spacer textile material, the tensile strand may interact with other features of an article of footwear, such the laces.

The embodiment depicted in FIG. 6 includes a tensile strand that extends from the spacer textile material along an edge as well as through the face of one layer. More specifically, portions of tensile strand 640 may be disposed between first layer 610 and second layer 620 of a spacer textile material 600. Further, spacer textile material 600 may include a plurality of connecting members 630 that extend between and join first layer 610 and second layer 620. Spacer textile material 600 of FIG. 6 also may have four edges, including first edge 680, second edge 682, third edge 684 and fourth edge 686, which are also edges of first layer 610 and second layer 620.

In some embodiments, portions of spacer textile material 600 may be welded together using methods such as those described above. Spacer textile material 600 may include a plurality of welds that includes first weld 650, second weld 652, third weld 654, and fourth weld 657. First weld 650, second weld 652, third weld 654, and fourth weld 657 form two channels, first channel 660 and second channel 662, in the spacer textile material. For purposes of reference, first channel 660 and second channel 662 may be collectively referred to as a plurality of channels.

In this embodiment, first channel 660 and second channel 662, along with first weld 650, second weld 652, third weld 654 and fourth weld 657 are arranged in a generally non-linear pattern. In particular, first channel 660 extends from first edge 680 at a first angle 671, while second channel 662 extends from first edge 680 at a second angle 673. In some embodiments, first angle 671 is substantially greater than second angle 673. Moreover, this difference in orientation relative to first edge 680 means that first channel 660 and second channel 662 are generally not parallel to one another. In other words, first channel 660 and second channel 662 (as well as their associated welds) are arranged in a non-linear pattern on spacer textile material 600.

The non-linear pattern for the plurality of channels comprised of first channel 660 and second channel 662 results in a generally non-linear pattern for tensile strand 640 as tensile strand 640 is constrained to move through first channel 660 and second channel 662. In FIG. 6, first portion 646 of tensile strand 640 may be disposed between first layer 610 and second layer 612 of spacer textile material 600. In addition, first portion 646 may be disposed in first channel 660, which extends to first opening 647. First opening 647 may be located on the face, or outer surface, of first layer 610. Tensile strand 640 may extend from spacer textile material 600 through first opening 647.

A second portion 656 of tensile strand 640 may extend from first opening 647 to second opening 648 and may be disposed outside of the spacer textile material 600. In some embodiments, second portion 656 forms a loop above the face of first layer 610. A third portion 649 of tensile strand 640 may be disposed in second channel 662 in spacer textile material 600 from second opening 648 to first edge 680.

Because first portion 646 of tensile strand 640 and third portion 649 of tensile strand 640 extend through non-parallel channels (first channel 660 and second channel 662), first portion 650 and third portion 649 are likewise oriented in non-parallel directions. In particular, first portion 650 may be oriented at an approximate angle 693 with respect to first edge 680, while third portion 649 may be oriented at an approximate angle 695 with respect to first edge 680. In some embodiments, angle 693 and angle 695 may be approximately different angles such that first portion 646 and third portion 649 are non-parallel.

Additionally, as second portion 656 forms a loop-like portion having non-zero curvature 697, second portion 656 is seen to have a non-linear shape. Moreover, second portion 656 is non-parallel with first portion 650 and third portion 649.

By arranging first channel 660 and second channel 662 as well as tensile strand 640 in non-linear patterns or configurations, the tension applied to spacer textile material 600 by tensile strand 640 can be oriented in a variety of different directions. Moreover, using a plurality of channels arranged in generally non-linear patterns may allow for smoother travel of tensile strand 640 through the channels by avoiding sharp turns and/or kinks that may otherwise develop in configurations where a tensile strand exits one channel and enters an adjacent channel that is parallel to original channel.

The embodiments described throughout the detailed description characterize the orientations of one or more channels (or tensile strand portions) relative to an edge of the spacer textile material. However, the orientations could also be characterized using angles relative to any other portion of the spacer textile material. For example, angles measured relative to any approximately straight feature (an edge of the spacer textile material, an edge of a sole, a stitch, as well as other approximately straight features) that intersects two or more channels, welds or tensile strands may be substantially different for any two non-parallel channels, welds or tensile strands.

Figure 7:
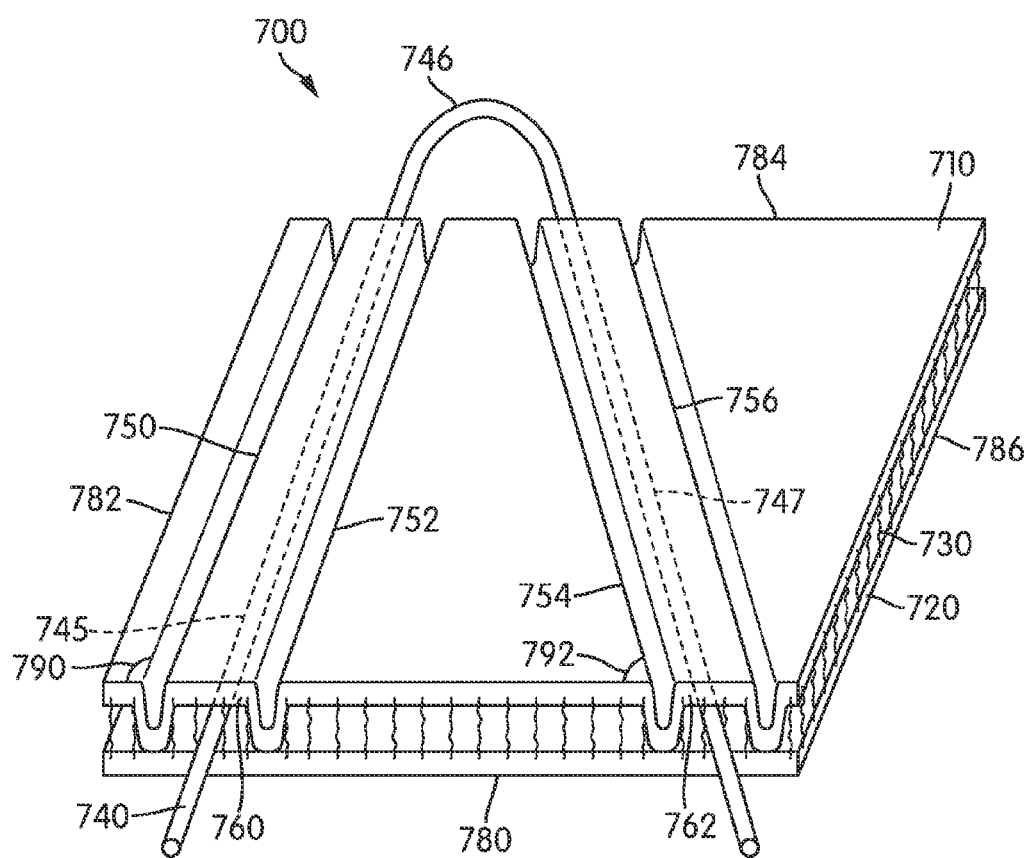
FIG. 7 is a schematic diagram of an embodiment of the spacer textile material having a tensile strand where the tensile strand is located through the spacer textile material in a non-linear pattern.

FIG. 7 depicts another embodiment in which a plurality of channels formed in a spacer textile material are positioned in a non-linear configuration. As shown in FIG. 7, a tensile strand 740 may be disposed between first layer 710 and second layer 720 of a spacer textile material 700. Further, spacer textile material 700 may include a plurality of connecting members 730 that extend between and join first layer 710 and second layer 720. Spacer textile material 700 also may have four edges, including first edge 780, second edge 782, third edge 784 and fourth edge 786, which are also edges of first layer 710 and second layer 720. Portions of tensile strand 740 may be disposed between first layer 710 and second layer 720 and in the space created between connecting members 730.

Spacer textile material 700 may further include a first channel 760, formed by first weld 750 and second weld 752, and a second channel 762, formed by third weld 754 and fourth weld 756, respectively. In this embodiment, first channel 760 and second channel 762 may be oriented in non-parallel directions. In particular, first channel 760 may generally form an angle 790 with first edge 780, while second channel 762 may generally form an angle 792 with first edge 780. In some embodiments, angle 790 may be approximately a right angle, such that first channel 760 generally extends in a perpendicular manner from first edge 780. In some embodiments, angle 792 may generally be an acute angle that is substantially less than 90 degrees.

This generally non-linear arrangement for first channel 760 and second channel 762 may result in a non-linear arrangement for tensile member 740, which extends through first channel 760 and second channel 762. In particular, a first portion 745 of tensile member 740 may run generally parallel with first channel 760, while a third portion 747 of tensile member 740 may run generally parallel with second channel 762. Since first channel 760 and second channel 762 are generally non-parallel, this configuration results in first portion 745 and third portion 747 of tensile member 740 also being generally non-parallel with one another. Moreover, second portion 746 of tensile member 740 is a curved portion that forms a loop extending between first channel 760 and second channel 762 along third edge 784.

Figure 8:
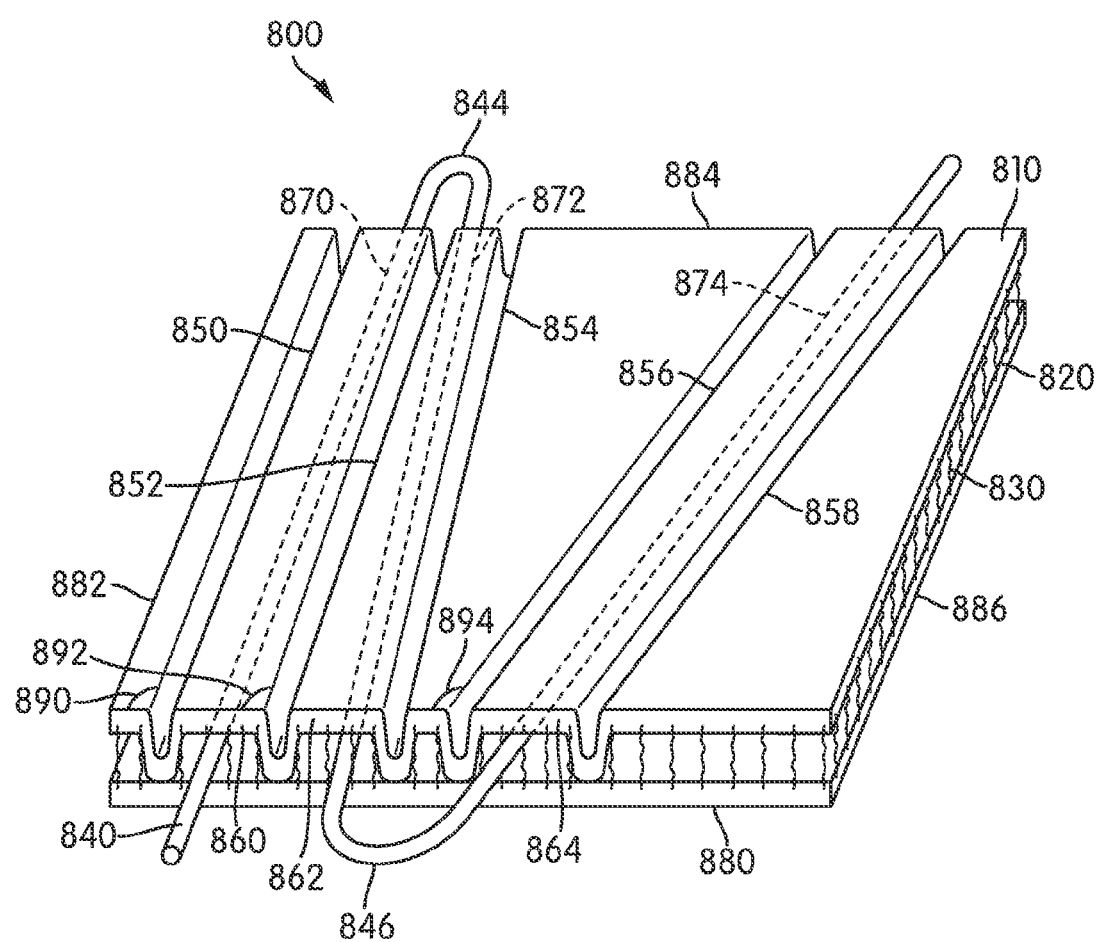
FIG. 8 is a schematic diagram of an embodiment of the spacer textile material having a tensile strand where the tensile strand is located through the spacer textile material in a non-linear pattern.

FIG. 8 illustrates an embodiment that may have three channels through which the tensile strand maybe disposed, none of which are parallel to each other. Similar to the embodiments described above, portions of a tensile strand 840 may be disposed between first layer 810 and second layer 820 of a spacer textile material 800. Further, spacer textile material 800 may include a plurality of connecting members 830 that extend between and join first layer 810 and second layer 820. Spacer textile material 800 also may have four edges, including first edge 880, second edge 882, third edge 884 and fourth edge 886, which are also edges of first layer 810 and second layer 820.

Spacer textile material 800 may include at least three channels. In particular, spacer textile material 800 may include first channel 860 (formed by first weld 850 and second weld 852), second channel 862 (formed by second weld 852 and third weld 854) and third channel 864 (formed by fourth weld 856 and fifth weld 858). Moreover, tensile member 840 may extend through each of first channel 860, second channel 862 and third channel 864. In particular, first portion 870, second portion 872 and third portion 874 of tensile member 840 may extend through first channel 860, second channel 862 and third channel 864, respectively. Additionally, a fourth portion 844 of tensile member 840 may extend between first channel 860 and second channel 862, while a fifth portion 846 of tensile member 840 may extend between second channel 862 and third channel 864.

In some embodiments, each of first channel 860, second channel 862 and third channel 864 may be oriented so that no two channels are parallel with one another. In particular, first channel 860 may be oriented at an angle 890 with respect to first edge 880 of spacer textile material 800. Second channel 862 may be oriented at an angle 892 with respect to first edge 880. Also, third channel 864 may be oriented at an angle 894 with respect to first edge 880. As seen in FIG. 8, angle 890, angle 892 and angle 894 may be substantially different angles. For example, angle 890 may be approximately 90 degrees, while angle 892 and angle 894 may be substantially greater than 90 degrees. Furthermore, angle 892 may be different than angle 894, for example, an angle between 90 degrees and the value of angle 894.

The configuration depicted in FIG. 8 allows the direction of the tension to be selectively tuned by varying the orientation of each channel disposed about the spacer textile material in a non-linear manner.

Figure 9:
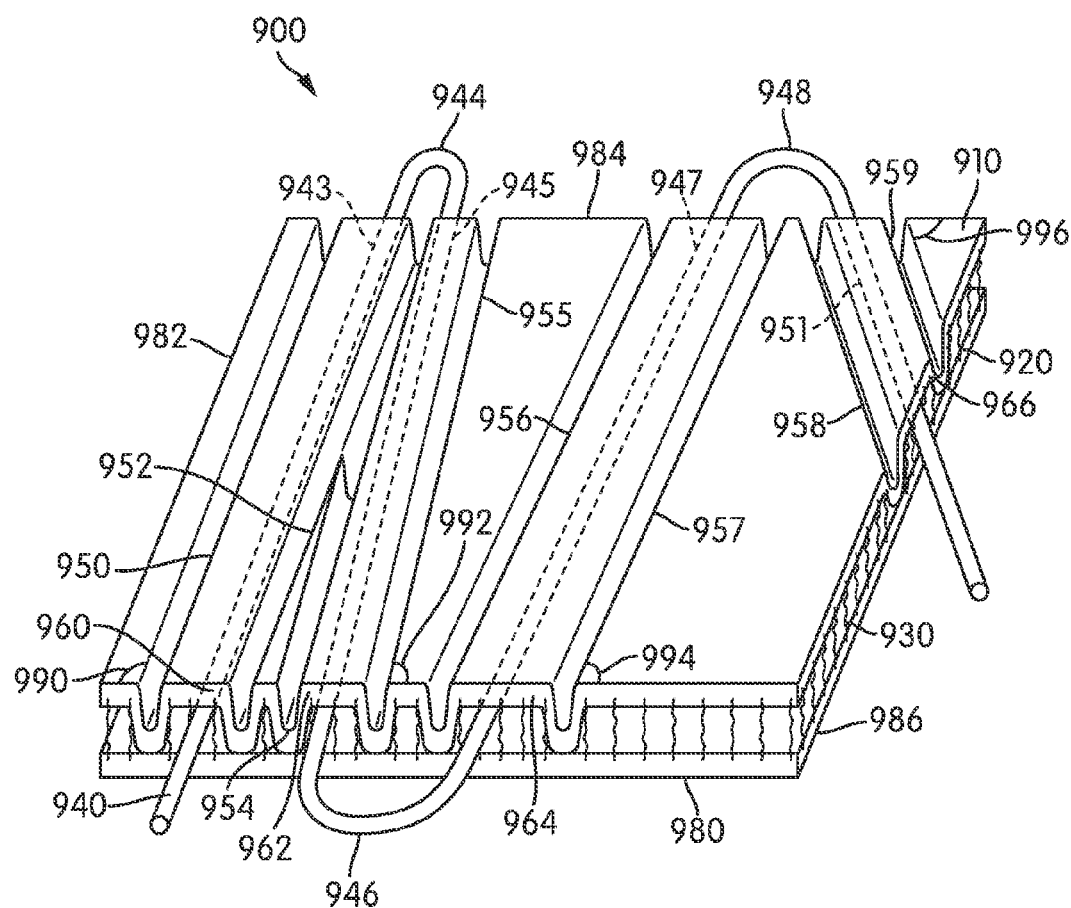
FIG. 9 is a schematic diagram of an embodiment of the spacer textile material having a tensile strand where the tensile strand is located through the spacer textile material in a non-linear pattern.

FIG. 9 illustrates an embodiment of a spacer textile material that includes four channels through which the tensile strand is disposed. In some embodiments, none of the four channels are parallel to each other. Similar to the embodiments described above, a tensile strand 940 may be disposed between first layer 910 and second layer 920 of a spacer textile material 900. Further, spacer textile material 900 may include a plurality of connecting members 930 that extend between and join first layer 910 and second layer 920. Spacer textile material 900 also may have four edges, first edge 980, second edge 982, third edge 984 and fourth edge 986, which are also edges of first layer 910 and second layer 920.

Spacer textile material 900 may include at least three channels. In particular, spacer textile material 900 may include first channel 960 (formed by first weld 950 and second weld 952), second channel 962 (formed by third weld 954 and fourth weld 955), third channel 964 (formed by fifth weld 956 and sixth weld 957) and fourth channel 966 (formed by seventh weld 958 and eighth weld 959). Moreover, tensile member 940 may extend through each of first channel 960, second channel 962, third channel 964 and fourth channel 966. In particular, first portion 943, second portion 945, third portion 947 and fourth portion 951 of tensile member 940 may extend through first channel 960, second channel 962, third channel 964 and fourth channel 966, respectively. Additionally, a fifth portion 944 of tensile member 940 may extend between first channel 960 and second channel 962. Also, a sixth portion 946 of tensile member 940 may extend between second channel 962 and third channel 964. Finally, a seventh portion 948 of tensile member 940 may extend between third channel 964 and fourth channel 966.

As discussed above, first channel 960, second channel 962, third channel 964 and fourth channel 966 may generally form a non-linear pattern on spacer textile material 900. In some embodiments, first channel 960 and second channel 962 are positioned in non-linear directions relative to each other. Further, second channel 962 and third channel 964 are positioned in non-linear directions relative to each other. Further, third channel 964 and fourth channel 966 are positioned in non-linear directions relative to each other. In other words, in some embodiments, the four channels are not parallel.

The channels of spacer textile material 900 may be disposed about spacer textile material 900 at different angles. For example, first channel 960 may extend from first edge 980 to opposite third edge 984 at any first angle 990 relative to first edge 980. Further, second channel 962 may extend from first edge 980 to opposite third edge 984 at any second angle 992 relative to first edge 980. Still further, third channel 964 may extend from first edge 980 to opposite third edge 984 at any third angle 994 relative to first edge 980. In addition, fourth channel 966 may extend from third edge 984 to fourth edge 986 at any fourth angle 996 relative to third edge 984. In some embodiments, first angle 990, second angle 992, third angle 994, and fourth angle 996 are substantially different from one another.

The configuration depicted in FIG. 9 allows the direction of the tension to be selectively tuned by varying the position of each channel. The channels of the embodiment shown in FIG. 9 are positioned in a non-linear manner in spacer textile material 900.

Some embodiments may include sets of channels that function independently to apply tension selectively throughout a spacer textile material. In some embodiments, such sets of channels (and corresponding tensile strands) could be arranged in various non-linear patterns.

Figure 10:
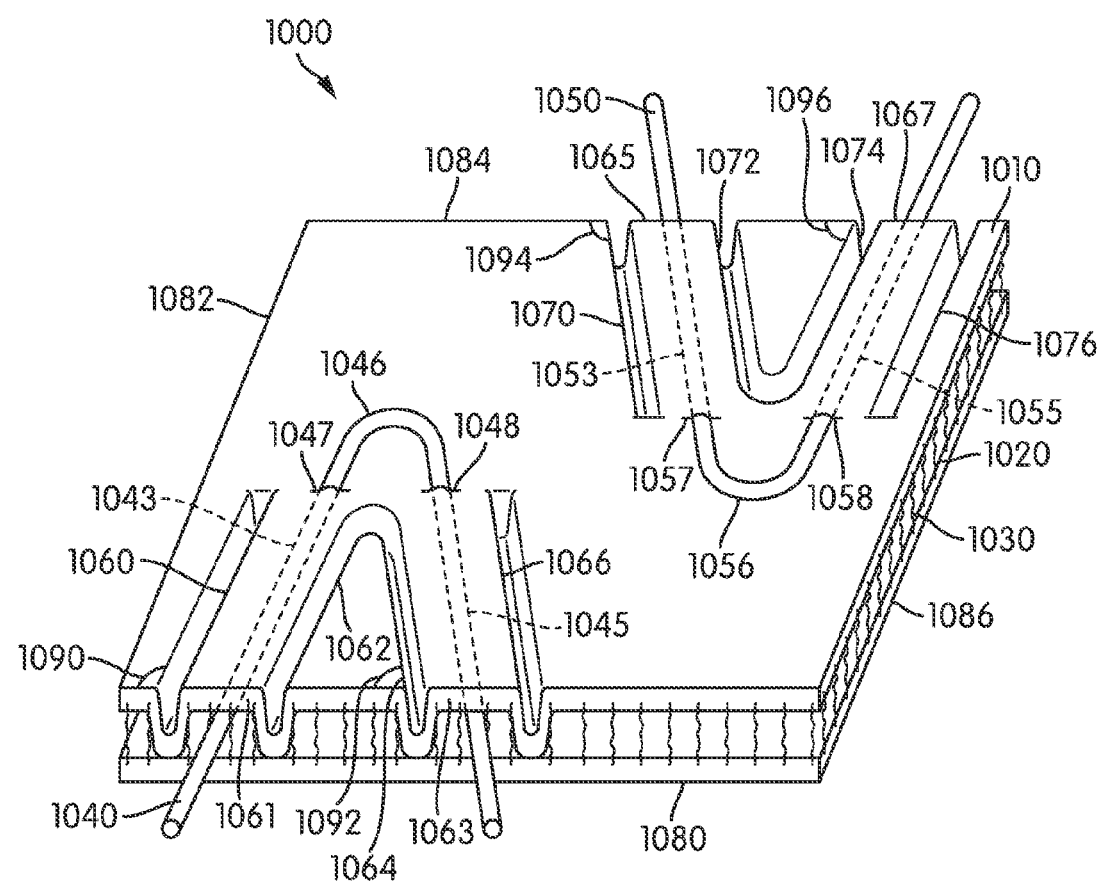
FIG. 10 is a schematic diagram of an embodiment of the spacer textile material having two tensile strands where the tensile strands are located about the spacer textile material in multiple non-linear patterns.

FIG. 10 depicts an embodiment where at least two strands may be disposed within or about the spacer textile material in a non-linear or non-parallel pattern. Each tensile strand may function substantially independently from other tensile strands. Therefore, the tension of each tensile strand may be selectively tuned for the location of the tensile strand on or about the spacer textile material.

As previously discussed, some embodiments include configurations in which tensile strands are disposed both between layers as well as along an outer face of at least one layer. As shown in FIG. 10, portions of first tensile strand 1040 may be disposed between first layer 1010 and second layer 1020 of spacer textile material 1000. In addition, portions of first tensile strand 1040 may be disposed externally above the face of a layer of spacer textile material 1000. Further, portions of second tensile strand 1050 may be disposed between first layer 1010 and second layer 1020 of spacer textile material 1000. Still further, portions of second tensile strand 1050 may be disposed externally above the face of a layer of spacer textile material 1000.

Spacer textile material 1000 of FIG. 10 may include a plurality of connecting members 1030 that extend between and join first layer 1010 and second layer 1020. Spacer textile material 1000 of FIG. 10 also may have four edges, including first edge 1080, second edge 1082, third edge 1084 and fourth edge 1086, which are also edges of first layer 1010 and second layer 1020.

Spacer textile material 1000 may further include a first channel 1061, formed by first weld 1060 and second weld 1062, and a second channel 1063, formed by third weld 1064 and fourth weld 1066. In this embodiment, first channel 1061 and second channel 1063 may be oriented in non-parallel directions. In particular, first channel 1061 may generally form an angle 1090 with first edge 1080, while second channel 1063 may generally form an angle 1092 with first edge 1080. In some embodiments, angle 1090 and angle 1092 may be substantially different such that first channel 1061 and second channel 1063 are generally non-parallel.

Spacer textile material 1000 may also include a third channel 1065, formed by fifth weld 1070 and sixth weld 1072, and a fourth channel 1067, formed by seventh weld 1074 and an eighth weld 1076. In this embodiment, third channel 1065 and fourth channel 1067 may be oriented in non-parallel directions. In particular, third channel 1065 may generally form an angle 1094 with third edge 1084, while fourth channel 1067 may generally form an angle 1096 with third edge 1084. In some embodiments, angle 1094 and angle 1096 may be substantially different such that third channel 1065 and fourth channel 1067 are generally non-parallel.

In this embodiment, first channel 1061 and second channel 1063 may generally be associated with a first tensile member 1040 while third channel 1065 and fourth channel 1067 may generally be associated with a second tensile member 1050, which may be a distinct tensile member from first tensile member 1040. In particular, first tensile member 1040 includes first portion 1043 and third portion 1045 which extend through first channel 1061 and second channel 1063, respectively. Additionally, a second portion 1046 of tensile member 1040 extends from first opening 1047 and second opening 1048 such that second portion 1046 is exposed along the outer surface of spacer textile material 1000. Additionally, second tensile member 1050 includes first portion 1053 and third portion 1055 which extend through third channel 1065 and fourth channel 1067, respectively. Additionally, a second portion 1056 of tensile member 1050 extends from third opening 1057 and fourth opening 1058 such that second portion 1056 is exposed along the outer surface of spacer textile material 1000.

This particular configuration provides a non-linear pattern for first channel 1061, second channel 1063, third channel 1065 and fourth channel 1067. Moreover, these non-linear channel arrangements provide non-linear arrangements for first tensile member 1040 and second tensile member 1050, which are configured to apply tension to spacer textile material 1000 independently of one another.

As show in FIG. 10, more than one tensile strand may be disposed between the first layer and second layer of a spacer textile material in a non-linear manner. By positioning each tensile strand in specific non-linear locations, the tension in each location may be selectively tuned with each tensile strand independent of the other tensile strands.

The above described spacer textile material may be incorporated into at least a portion of an article of footwear. The spacer textile material may be incorporated into at least a portion of a shoe upper. In some embodiments, the spacer textile material is the shoe upper.

Figure 11:
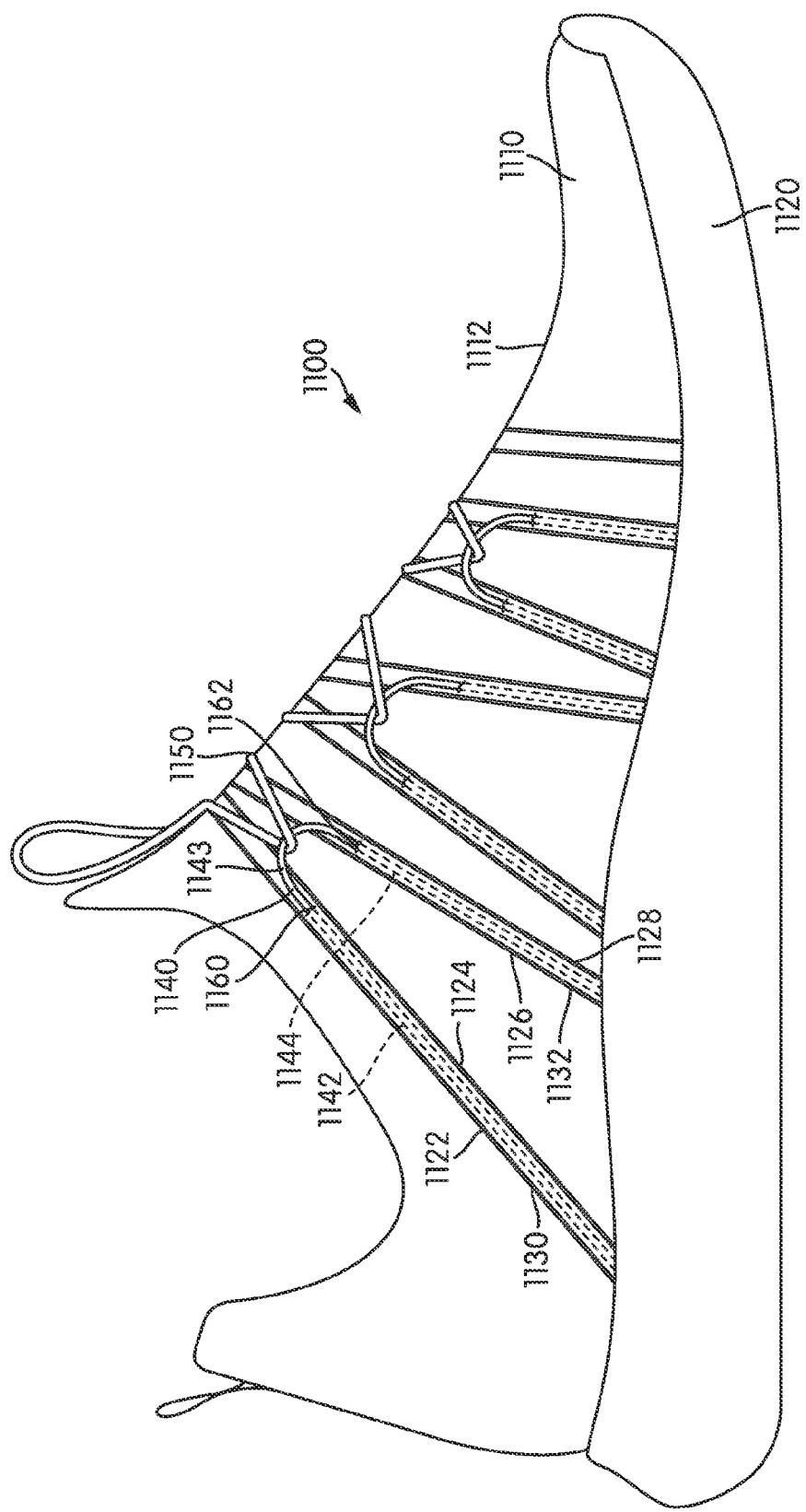
FIG. 11 is a schematic diagram of an embodiment of an article of footwear incorporating a spacer textile material having tensile strands arranged in a non-linear pattern as a portion of the upper of the article of footwear.

When incorporated into a shoe upper, the spacer textile material may have any number of tensile strands. The tensile strands of the spacer textile material incorporated into a shoe upper may be disposed in the spacer textile material in any location within or about the spacer textile material. An embodiment, as shown in FIG. 11, incorporates multiple tensile strands into a spacer textile material. In addition, the tensile strands are located in the spacer textile material in a non-linear pattern.

The tensile strands shown in article of footwear 1100 depicted in FIG. 11 may be disposed in spacer textile material 1110 incorporated into shoe upper 1112. As shown in FIG. 11, spacer textile material 1110 may include multiple welds that define multiple channels. More specifically, first weld 1122 and second weld 1124 define first channel 1130. Similarly, third weld 1126 and fourth weld 1128 define second channel 1132. First portion 1142 of tensile strand 1140 may be disposed in first channel 1130. Further, first portion 1142 may extend from sole structure 1120 within first channel 1130 to first opening 1160 disposed on the outer face of the outer layer of spacer textile material 1110. Tensile strand 1140 may extend from spacer textile material 1110 through first opening 1160. Second portion 1143 of tensile strand 1140 may form a loop on the exterior of spacer textile material 1110. Second portion 1143 may be disposed between first opening 1160 and second opening 1162.

Third portion 1144 of tensile strand 1140 may be further disposed in the spacer textile material through second opening 1162. Third portion 1144 may extend from second opening 1162 within second channel 1132 to sole structure 1120.

Portions of each tensile strand may further be similarly disposed in the spacer textile material and through the remaining channels. The channels of spacer textile material 1110 may be positioned in a non-linear manner. In some embodiments, none of the angles of the channels, relative to the sole structure, are the same.

As shown in FIG. 11, a portion of each tensile strand may remain outside of the spacer textile material between the two openings on the outer face of the outer layer of the spacer textile material. This exposed portion of the tensile strand may be a loop that may be utilized as a shoe lace eyelet. Through the multiple loops in the shoe upper of FIG. 11, a shoe lace may be disposed.

More specifically, second portion 1143 of tensile strand 1140 forms a loop on the exterior of spacer textile material 1110. The loop, or second portion 1143, may be disposed between first opening 1160 and second opening 1162. The loop, or second portion 1143, may also act as an eyelet to receive the shoe lace 1150.

When shoe lace 1150 is tightened, tensile strand 1140 is also tightened, or in other words, placed under an increased tension. The tightened tensile strand 1140 provides both better support and a better fit for the wearer of the shoe in the particular area that tensile strand 1140 is disposed about spacer textile material 1110, among other improvements. Therefore, the wearer of the shoe may tighten shoe lace 1150 to customize the fit of upper 1112 of shoe 1100.

In addition, in some embodiments, each tensile strand may have the same stretch and flexibility. In other embodiments, each tensile strand may have different flexibility or stretch. Accordingly, a tensile strand may be selectively disposed in or about the spacer textile material in specific locations to provide specific support. For instance, a tensile strand having less flexibility or stretch may be located in or about the spacer textile material of the shoe upper in an area that requires more support. Further, a tensile strand having greater flexibility or stretch may be located in or about the spacer textile material of the shoe upper in an area that requires more flex and stretch during use. Therefore, a shoe upper may include multiple tensile strands with varying degrees of stretch and flex. The stretch and flex of each tensile strand will depend on its location on a particular shoe upper.

While FIG. 11 depicts an article of footwear comprising a shoe upper having a spacer textile material that includes multiple tensile strands, the disclosure is not limited to the particular pattern depicted in FIG. 11. Any of the various patterns or any combination of patterns described above may be incorporated into a similar article of footwear as well as possibly other articles and other kinds of apparel.

During activities that involve walking, running, or other ambulatory movements (e.g., cutting, braking), a foot within the shoes described above may tend to stretch the upper component of the shoe. That is, many of the material elements forming the upper (e.g., spacer textile material layers) may stretch when placed in tension by movements of the foot. Although the tensile strands or individual segments of the tensile strands may also stretch, the tensile strand generally stretches to a lesser degree than the other material elements forming the upper. The various segments of the tensile strands may be located, therefore, to form structural components in the upper that (a) resist stretching in specific directions or locations, (b) limit excess movement of the foot relative to the sole structure and the upper, (c) ensure that the foot remains properly positioned relative to the sole structure and the upper, and (d) reinforce locations where forces are concentrated.

In addition, the welds forming the channels of the spacer textile material may also form structural components in the upper. The welds, a fusion of the first layer to the second layer of the spacer textile material, may also assist the upper to (a) resist stretching in specific directions or locations, (b) limit excess movement of the foot relative to the sole structure and the upper, (c) ensure that the foot remains properly positioned relative to the sole structure and the upper, and (d) reinforce locations where forces are concentrated.

In addition to above advantages, the tensile strands also may extend at least partially around lace apertures or act as lace apertures themselves. As such, a tensile strand may extend (a) upward from lower region of the upper or from the sole structure to a lace region, (b) exit and be disposed in the spacer textile materials forming a loop in the lace region, and (c) travel downward from lace region to the lower region of the upper or the sole structure. In this manner, the loops formed from the tensile strands effectively are lace apertures. A shoe lace may be laced through the tensile strand loops. When the lace is tightened, tension in the lace effectively places the tensile strands in tension, which has the advantage of tightening the upper around the foot and further (a) limiting excess movement of the foot relative to the sole structure and the upper, and (b) ensuring that the foot remains properly positioned relative to the sole structure and the upper.

Based upon the above discussion, each of spacer textile material having tensile strands may have various configurations. Although each of these configurations are discussed separately, many of the concepts presented above may be combined to impart specific properties or otherwise ensure that spacer textile material having tensile strands are optimized for a particular purpose or product.

In still other embodiments, a spacer textile material including tensile strands arranged in various configurations may incorporated into various kinds of articles including, but are not limited to: hiking boots, soccer shoes, football shoes, sneakers, running shoes, cross-training shoes, rugby shoes, basketball shoes, baseball shoes as well as other kinds of shoes. Moreover, in some embodiments, a spacer textile material may be incorporated into various kinds of non-sports related footwear, including, but not limited to: slippers, sandals, high heeled footwear, loafers as well as any other kinds of footwear.

The spacer textile material could also be incorporated into various kinds of articles of apparel and/or sporting equipment (e.g., gloves, helmets, etc.). In some embodiments, the article may include one or more articulated portions that are configured to move. In other cases, the article may be configured to conform to portions of a wearer in a three-dimensional manner. Examples of articles that are configured to be worn include, but are not limited to: footwear, gloves, shirts, pants, socks, scarves, hats, jackets, as well as other articles. Other examples of articles include, but are not limited to: protective equipment such as shin guards, knee pads, elbow pads, shoulder pads, as well as any other type of protective equipment. Additionally, in some embodiments, the article could be another type of article including, but not limited to: bags, purses, backpacks, as well as other articles that may or may not be worn.

While various embodiments have been described, the description is intended to be exemplary, rather than limiting and it will be apparent to those of ordinary skill in the art that many more embodiments and implementations are possible that are within the scope of the embodiments. Accordingly, embodiments are not to be restricted except in light of the attached claims and their equivalents. Also, various modifications and changes may be made within the scope of the attached claims.

What is claimed is:

1. An article of footwear comprising:
   an upper and a sole structure,
   wherein at least a portion of the upper comprises a spacer textile material comprising:
   a first layer;
   a second layer;
   a plurality of connecting members extending between and joining the first layer and the second layer;
   a tensile strand,
   wherein the first layer is joined to the second layer along a plurality of welds and wherein the plurality of welds define a plurality of channels arranged in a non-linear pattern;
   wherein a first portion of the tensile strand is disposed within a first channel of the plurality of channels, a third portion of the tensile strand is disposed within a second channel of the plurality of channels;
   a second portion of the tensile strand exits outside an outer face of the first layer of the spacer textile material; and
   wherein the second portion of the tensile strand extends along the outer face and enters back into the first layer.

2. The article of footwear according to claim 1, wherein the first channel is defined by a first weld and a second weld of the plurality of welds and the second channel is defined by a third weld and fourth weld of the plurality of welds.

3. The article of footwear according to claim 2, wherein the first channel is positioned at a first angle relative to the sole structure and the second channel is positioned at a second angle relative to the sole structure, and wherein the first angle is different from the second angle.

4. The article of footwear according to claim 3, wherein:
   the second portion of the tensile strand is disposed between the first portion of the tensile strand and the second portion of the tensile strand;
   wherein the second portion extends from a first opening on the outer face of the first layer and a second opening on the outer face of the first layer; and
   wherein the first opening is associated with the first channel and the second opening is associated with the second channel.

5. The article of footwear according to claim 4, wherein the second portion of the tensile strand forms a loop disposed outside of the spacer textile material above the outer face of the first layer.

6. The article of footwear according to claim 5, wherein a lace of the upper is inserted through the loop formed by the second portion such that tensioning the lace tensions the tensile strand.

7. The article of footwear according to claim 1, wherein the plurality of channels are disposed on a side of the upper.

8. An article of footwear comprising:
   an upper, wherein at least a portion of the upper comprises a spacer textile material;
   the spacer textile material including a first layer, a second layer, a plurality of connecting members extending between and joining the first layer and the second layer, and a tensile strand;
   wherein portions of the first layer and the second layer are in direct contact to define a plurality of channels arranged in a non-linear pattern;
   wherein the tensile strand extends through the plurality of channels;
   wherein a portion of the tensile strand is disposed outside an outer surface of the spacer textile material; and
   wherein the portion of the tensile strand extends through the outer surface at a first opening, forms a loop above the outer surface and enters the outer surface of the spacer textile material at a second opening.

9. The article of footwear according to claim 8, wherein the plurality of channels includes a first channel oriented in a non-parallel direction from a second channel.

10. The article of footwear according to claim 9, wherein the tensile strand extends through the first channel and the second channel.

11. The article of footwear according to claim 10, wherein the portions of the first layer and the second layer that are in direct contact are welds.

12. The article of footwear according to claim 11, wherein the first channel is positioned at a first angle relative to an edge of the spacer textile material and the second channel is positioned at a second angle relative to the edge of the spacer textile material, and wherein one of the first angle and the second angle is a right angle.

13. An article of footwear comprising:
   an upper and a sole structure,
   wherein at least a portion of the upper comprises a spacer textile material including:
   a first layer;

a second layer;
a plurality of connecting members extending between and joining the first layer and the second layer;
a tensile strand,
a first channel bounded by a first weld and a second weld;
a second channel bounded by a third weld and a fourth weld;
a third channel bounded by a fifth weld and a sixth weld;
wherein the first layer is joined to the second layer along the first weld, the second weld, the third weld, the fourth weld, the fifth weld and the sixth weld;
wherein the first channel, the second channel and the third channel are arranged in a non-linear pattern;
wherein a first portion of the tensile strand is disposed within the first channel, a second portion of the tensile strand is disposed within the second channel and a third portion of the tensile strand is disposed within the third channel;
wherein a fourth portion of the tensile strand extends outwardly from a first edge of the spacer textile material between the first channel and the second channel; and
wherein a fifth portion of the tensile strand extends outwardly from a second edge of the spacer textile material between the second channel and the third channel, the second edge of the spacer textile material is opposite the first edge of the textile material.

14. The article of footwear according to claim 13, wherein the first channel forms a first angle with an edge of the spacer textile material.

15. The article of footwear according to claim 14, wherein the second channel forms a second angle with the edge of the spacer textile material and wherein the first angle is different from the second angle.

16. The article of footwear according to claim 15, wherein the third channel forms a third angle with the edge of the spacer textile material.

17. The article of footwear according to claim 16, wherein the second angle and the third angle are different.

18. The article of footwear according to claim 17, wherein the first channel is oriented in a non-parallel direction from the second channel and the third channel is oriented in a non-parallel direction from the second channel.

19. The article of footwear according to claim 18, wherein a fourth portion of the tensile strand extends between the first channel and the second channel, and a fifth portion of the tensile strand extends between the second channel and the third channel.

20. A spacer textile material comprising:
a first layer;
a second layer;
a plurality of connecting members extending between and joining the first layer and the second layer;
a tensile strand,
wherein a first portion of the tensile strand and a second portion of the tensile strand are disposed between the first layer and second layer,
a first channel and a second channel bounded by portions of the first layer and the second layer that are in direct contact;
wherein the first portion of the tensile strand is disposed within the first channel and wherein the second portion of the tensile strand is disposed within the second channel;
a third portion of the tensile strand extending outwardly from an outer surface of the first layer;
wherein the third portion of the tensile strand extends through the outer surface at a first opening, forms a loop above the outer surface and enters the outer surface of the first layer at a second opening; and
wherein the first channel and the second channel are arranged in a non-linear pattern.

21. The spacer textile material according to claim 20, wherein the spacer textile material comprises three or more channels.

22. The spacer textile material according to claim 20, wherein the first channel forms a first angle with an edge of the spacer textile material.

23. The spacer textile material according to claim 22, wherein the second channel forms a second angle with the edge of the spacer textile material and wherein the second angle is different from the first angle.

24. The spacer textile material according to claim 23, wherein one of the first angle and the second angle is a right angle.

25. A spacer textile material comprising:
a first layer;
a second layer;
a plurality of connecting members extending between and joining the first layer and the second layer;
a tensile strand,
wherein the first layer is joined to the second layer to define a plurality of channels arranged in a non-linear pattern;
wherein the tensile strand extends through the plurality of channels;
wherein the plurality of channels includes a first channel that is oriented at a first angle relative to an edge of the spacer textile material;
wherein the plurality of channels includes a second channel that is oriented at a second angle relative to the edge of the spacer textile material;
wherein the first angle and the second angle are different;
wherein the plurality of channels includes a third channel that is oriented at a third angle relative to the edge of the spacer textile material; and
wherein a first portion of the tensile strand extends outwardly from a first edge of the spacer textile material between the first channel and the second channel; and
wherein a second portion of the tensile strand extends outwardly from a second edge of the spacer textile material between the second channel and the third channel, the second edge of the spacer textile material is opposite the first edge of the textile material.

26. The spacer textile material according to claim 25, wherein the second angle and the third angle are different.

27. The spacer textile material according to claim 26, wherein none of the first angle, the second angle and the third angle are the same.

28. The spacer textile material according to claim 26, wherein no adjacent channels are parallel to each other.

29. The spacer textile material according to claim 25, wherein the tensile strand extends through the first channel, the second channel and the third channel.

* * * * *